(12) United States Patent
Hermann

(10) Patent No.: US 6,205,383 B1
(45) Date of Patent: Mar. 20, 2001

(54) METHOD AND APPARATUS FOR TRANSMITTING DIGITAL DATA FROM A MEASUREMENT STATION OF AN OCCUPANT PROTECTION SYSTEM IN A MOTOR VEHICLE TO AN AIR BAG CONTROL UNIT

(75) Inventor: Stefan Hermann, Köfering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/444,962

(22) Filed: Nov. 22, 1999

Related U.S. Application Data

(63) Continuation of application No. PCT/DE98/01380, filed on May 19, 1998.

(30) Foreign Application Priority Data

May 21, 1997 (DE) .............................................. 197 21 304

(51) Int. Cl.$^7$ ...................................................... G06F 11/00
(52) U.S. Cl. ........................... 701/45; 280/734; 280/735; 280/728.1; 73/432.1
(58) Field of Search .............................. 701/45; 280/735, 280/734, 728.1; 73/432.1

(56) References Cited

U.S. PATENT DOCUMENTS

| 5,083,276 | * | 1/1992 | Okano et al. . | |
| 5,343,394 | * | 8/1994 | Takeuchi et al. | 701/45 |
| 5,475,269 | * | 12/1995 | Takeuchi | 307/10.1 |
| 5,495,414 | * | 2/1996 | Spangler et al. | 701/45 |
| 5,530,649 | * | 6/1996 | Fujishima | 701/46 |
| 5,606,501 | * | 2/1997 | Gioutsos et al. | 701/36 |
| 5,712,784 | | 1/1998 | Fendt et al. . | |
| 5,809,439 | * | 9/1998 | Damisch | 701/45 |
| 5,847,472 | * | 12/1998 | Byon | 307/10.1 |
| 5,995,891 | * | 11/1999 | Mayumi et al. | 701/45 |

FOREIGN PATENT DOCUMENTS

0384258A2    8/1990  (EP) .

* cited by examiner

Primary Examiner—William A. Cuchlinski, Jr.
Assistant Examiner—Olga Hernandez
(74) Attorney, Agent, or Firm—Herbert L. Lerner; Laurence A. Greenberg; Werner H. Stemer

(57) ABSTRACT

Digital data are transmitted from a measurement station to an air bag control unit in a motor vehicle. A direct signal of the air bag control unit which serves the purpose of supplying energy to the measurement station is current-modulated and thereby varied in accordance with the data to be transmitted. The variations in the current are controlled such that they cancel one another on average over time.

13 Claims, 2 Drawing Sheets

METHOD AND APPARATUS FOR TRANSMITTING DIGITAL DATA FROM A MEASUREMENT STATION OF AN OCCUPANT PROTECTION SYSTEM IN A MOTOR VEHICLE TO AN AIR BAG CONTROL UNIT

CROSS REFERENCE TO RELATED APPLICATION

This is a continuation of copending International Application PCT/DE98/01380, filed May 19, 1998, which designated the United States.

BACKGROUND OF THE INVENTION

Field of the Invention

The invention lies in the automotive field. More specifically, the present invention relates to a method and apparatus for transmitting digital data from a measurement station of an occupant protection system in a motor vehicle to an air bag control unit. The apparatus includes an air bag control unit, a measurement station connected to the air bag control unit, a direct current or direct voltage source in the air bag control unit for supplying the measurement station with a direct signal, first means in the measurement station for varying the direct signal in accordance with the data to be transmitted, and second means in the air bag control unit for detecting and evaluating changes in the direct signal as current changes. The measurement station is supplied with a direct signal from a direct current or direct voltage source of the air bag control unit and varies the direct signal in accordance with the data to be transmitted. The variations in the direct signal are then detected as current changes in the air bag control unit and evaluated.

For tripping circuits of occupant protection systems, which cause air bags or belt tensioners to be tripped in the event of an accident, for instance, signals must be transmitted from remotely located sensors (measurement stations) to a central control unit (air bag control unit). With increasing progress in the development of occupant protection systems, the associated sensors are being installed at more and more places in the vehicle. If the requisite short tripping times are to be adhered to, these remotely located sensors must be polled constantly, and the sensor signals must be transmitted reliably to the central control unit.

U.S. Pat. No. 5,712,784 to Fendt et al. (European patent application EP 0 693 401 A2) discloses a data transmission method in which pulse width modulated signals are generated by the affected remotely located sensors and are transmitted to the central control unit. The data information is encoded in the duty factor.

In a system for controlling an occupant protection device, such as an air bag, the entire system must be kept in operation for a minimum period after a collision in which the on-board electrical system and thus the energy supply to the system have been destroyed. To that end, in the air bag control unit, independent energy reserves, such as capacitors, are typically furnished for the individual circuit elements, so that this emergency operation can be assured for a minimum length of time. Such energy stores are not only expensive but also take up space.

SUMMARY OF THE INVENTION

It is accordingly an object of the invention to provide a method and an apparatus for a motor vehicle occupant protection system, which overcomes the above-mentioned disadvantages of the heretofore-known devices and methods of this general type and in which the energy reserves for emergency operation can be minimized.

With the foregoing and other objects in view there is provided, in accordance with the invention, a method of transmitting digital data from a measurement station of a motor vehicle occupant protection system to an air bag control unit, which comprises:

supplying a measurement station with a direct signal from a direct current or direct voltage source of an air bag control unit;

varying the direct signal with the measurement station in accordance with data to be transmitted;

transmitting data and thereby varying a current such that the variations cancel one another out on average over time; and detecting and evaluating the variations in the direct signal as current changes in the air bag control unit.

According to the invention, the current consumption for data transmission from the measurement station to the air bag control unit is reduced.

In accordance with an added feature of the invention, the transmitting step comprises:

transmitting the digital data in a train of binary characters;

transmitting a logic zero by leaving the direct signal unvaried;

transmitting a logic one by selectively increasing and decreasing the direct signal by a predetermined amount, and thereby increasing the direct signal if the direct signal had been decreased to transmit a preceding logic one; and decreasing the direct signal if the direct signal had been increased to transmit the preceding logic one.

In accordance with an additional feature of the invention, an energy store is provided in the measurement station. The energy store is charged to increase the current and discharged to reduce the current.

In accordance with a preferred embodiment of the invention, the energy store is a capacitor.

In accordance with another feature of the invention, two switches are connected to the energy store. The switches control the charging and discharging of the energy store. The switches are thereby triggered in alternation upon successive logic one values of the data train.

In accordance with a further feature of the invention, a series resistor is connected at the air bag control unit in at least one supply line connected to the measurement station, and the method further comprises measuring a voltage drop at the series resistor for ascertaining the transmitted data.

With the above and other objects in view there is also provided, in accordance with the invention, an apparatus for transmitting digital data in a motor vehicle, specifically for performing the above-outline method. The apparatus comprises:

an air bag control unit and a measurement station connected to the air bag control unit;

a direct current or direct voltage source in the air bag control unit for supplying the measurement station with a direct signal;

a first device in the measurement station for varying the direct signal in accordance with data to be transmitted to the air bag control unit, the first device include an energy store to be charged in controlled fashion to increase the current and to be discharged in controlled fashion to decrease the current; and a second device in the air bag control unit for detecting and evaluating changes in the direct signal in the form of current changes.

As noted above, the preferred energy store is a capacitor.

In accordance with again an added feature of the invention, the measurement station receives a supply voltage, the capacitor is connected in the measurement station such that, in an absence of data transmission, the capacitor is charged to an intermediate voltage between 0 V and the supply voltage, the first device includes a first switch and a second switch connected such that an actuation of the first switch causes the capacitor to increase the direct signal and an actuation of the second switch causes the capacitor to decrease the direct signal.

In accordance with again an additional feature of the invention, the measurement station includes a voltage regulator for deriving the supply voltage from the direct signal and a voltage divider subjected to the supply voltage, the voltage divider having a first resistor and a second resistor connected to one another at a node point acting as a center tap, the capacitor being connected between an input of the voltage regulator and the center tap of the voltage divider, the first switch being connected in parallel with the first resistor and the second switch being connected in parallel with the second resistor.

In accordance with again another feature of the invention, a common resistor connects the first and second switches to the center tap.

In accordance with again a further feature of the invention, the first device includes a trigger unit for triggering the first and second switches in accordance with the data train to be transmitted.

In accordance with a concomitant feature of the invention, the measurement station includes a sensor and a monitoring unit connected to the sensor, the monitoring unit generates the data trains to be transmitted in accordance with signals received from the sensor and forwards the data trains on to the trigger unit for transmission.

In the data transmission method known from the above-mentioned U.S. Pat. No. 5,712,784 (EP 0 693 401 A2), the sensor signal has two current level values, namely an H and an L level (also known as logic 1 and logic 0). The L level corresponds to the resting current of the sensor assembly. If the sensor signal is at the H level, then the current consumption is higher than at the L level. At a duty factor of 50%, the mean value of the transmitted sensor signal is then ½, if the H level is 1 and the L level is 0. The transmitted signal thus always has a direct current component. In resistors of the sensor assembly, this direct current component is consumed by being converted into thermal energy. On the other hand, in order to assure reliable signal transmission, the H level must be high enough. The high H level thus selected entails high current consumption on the part of the affected assembly for signal transmission.

As a result of the averaging, according to the invention, of the current changes, the direct current component required for the data transmission is zero. Thus the energy demand for the signal transmission is relatively slight, and accordingly the current supply to the external measurement stations in emergency operation, and thus also the energy reserves to be furnished, can be kept low. In particular, the energy furnished for the applicable measurement station then need not be furnished predominantly for the sake of communication with the air bag control unit.

Advantageously, signal transmission and the supply of electrical current are effected over a common line.

The terms air bag control unit and measurement station are used merely as examples. Thus the method of the invention can also be employed between two occupant protection control units of a motor vehicle, for instance. The measurement station may include a sensor for detecting a collision and can transmit sensor signals, or it may also be embodied as a firing station for an occupant protection means, which in the firing mode receives a trip command from the air bag control unit and thereupon heats up a firing element of a protection means.

The measurement station embodied as a firing station then transmits results of diagnostic measurements to the air bag control unit.

Other features which are considered as characteristic for the invention are set forth in the appended claims.

Although the invention is illustrated and described herein as embodied in a method and apparatus for transmitting digital data from a measurement station of an occupant protection system in a motor vehicle to an air bag control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
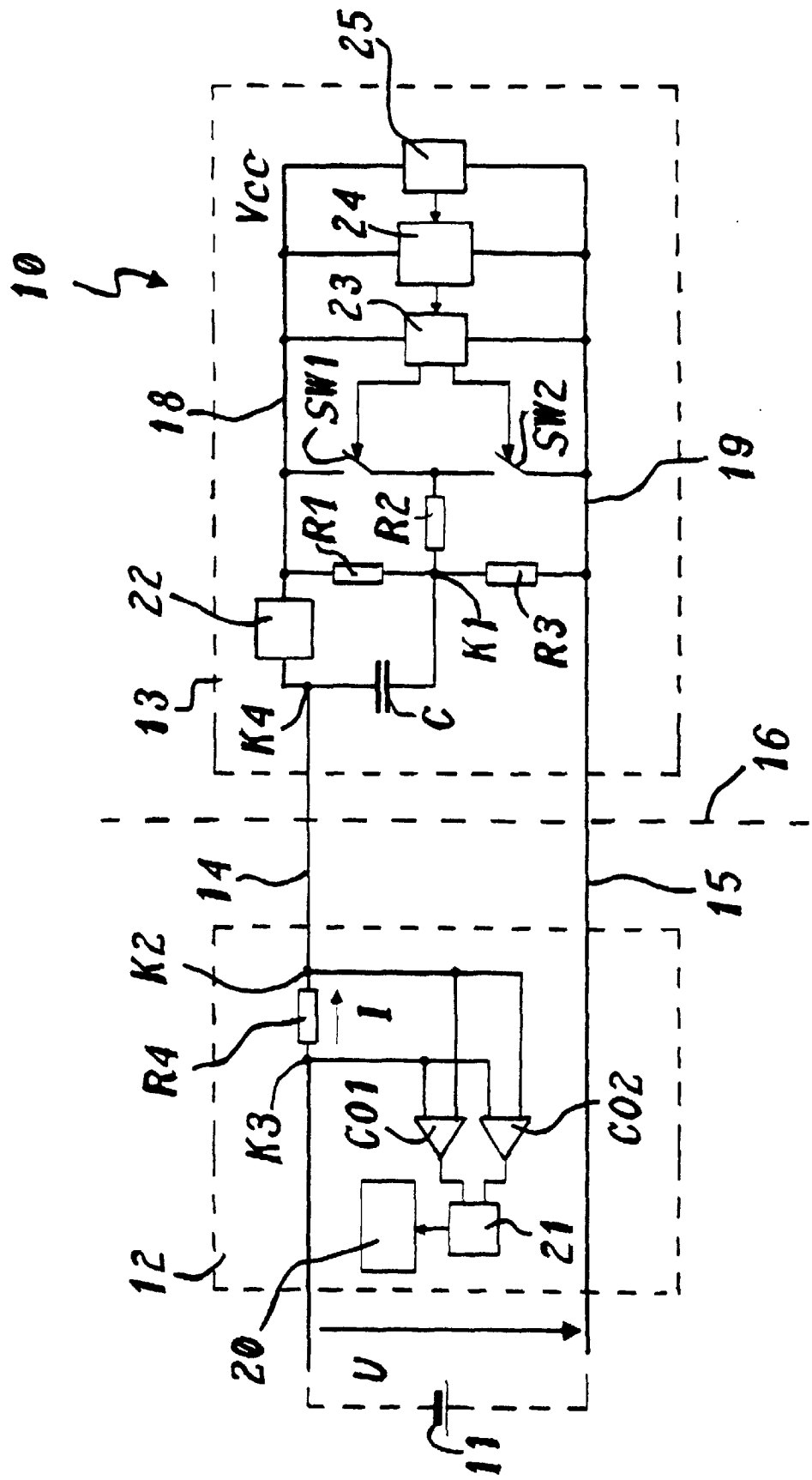
FIG. 1 is a schematic block circuit diagram of an exemplary embodiment of an apparatus according to the invention.

Referring now to the figures of the drawing in detail and first, particularly, to the block circuit diagram of FIG. 1, there is seen an apparatus according to the invention, in the form of an air bag system 10 for an air bag. The air bag system 10 includes an air bag control unit 12 and a measurement station 13, which communicate with the supply lines 14 and 15 via a current interface 16. Inside the measurement station 13, a sensor 25 for collision detection for a non-illustrated, associated air bag is provided. The sensor is supplied with current from a direct current source, in the present case a car battery 11, via the current interface 16. The sensor 25 is connected to a monitoring unit 24, such as a microprocessor provided with an A/D converter. The monitoring unit receives (analog) signals from the sensor 25, converts them into a train of digital (binary) data, and transmits them to the air bag control unit 12 at predetermined time intervals.

The transmission of the data is effected directly via the current interface 16, in that the direct current flowing through the current interface is modulated in accordance with the data train. In a series resistor R4 inserted into the supply line 14, the current modulation is detected as a voltage drop by two comparators CO1 and CO2 and sent on to a decoding unit 21. The decoded data signal is then delivered to an evaluation unit 20, where it is evaluated. The modulation of the current I by the resistor R4 is effected such that the current changes caused by the modulation cancel one another out on average over time; that is, the direct current component resulting from the data transmission is zero. This is preferably attained by providing that in the manner of an AMI (alternate-mark inversion) encoding, every other 1 value, in a binary data train comprising 0 and 1 values that is to be transmitted and of the kind shown for instance in FIG. 2a, is converted into a −1 value as shown in FIG. 2d). Since on average over time, just as many positive (i.e., 1) as negative (−1) values always occur, the result—if the 1 value corresponds to a current increase and the −1 value corresponds to an equally great current decrease or current reversal—is a vanishingly small direct current value.

The current modulation, corresponding to the AMI encoding, in the current interface 16 is attained as follows, taking the circuitry of FIG. 1 as an example: In the measurement station 13, a supply voltage Vcc, preferably 5 V, that is required for the sensor 25 and the other electronics is derived from the battery voltage U of the battery 11 by means of a voltage regulator 22 in series with it and is made available between the ground line 19 and the supply line 18. For the current modulation, an energy store is provided, which for increasing the current is charged from the current interface 16 and for lowering the current is discharged into the current interface 16. The energy store includes a capacitor C (e.g. 1 μF), for example, which is connected between the input of the voltage regulator and the center tap (node point K1) of a voltage divider formed of two resistors R1 and R3. The voltage divider is connected between the lines 18 and 19. The two resistors R1 and R3 have the same resistance (e.g. 10 kΩ), so that the node point K1 lies at a voltage of Vcc/2, or for instance 2.5 V.

For the current modulation, by means of two switches SW1 and SW2, the node point K1 can now be connected selectively, via a further, markedly smaller resistor R2 (e.g. 100 Ω), either to the potential of the supply line 18 (Vcc), by closing the switch SW1, or to the potential of the ground line 19, by closing the switch SW2. In the process, the potential at the node point K1 shifts by ±2.5 V (Vcc/2). The potential at the node point K4 on the other side of the capacitor C shifts accordingly. If the potential at K4 is shifted upward by 2.5 V by closing the switch SW1, then the capacitor C, which is charged in the state of repose, discharges into the current interface 16, and the current I through the resistor R4 (e.g. 10 Ω) decreases or is reversed. If the potential at K4 is lowered by 2.5 V by closing the switch SW2, then the capacitor C charges still further from the current interface 16, and an additional charging current flows through the resistor R4.

Figure 2:
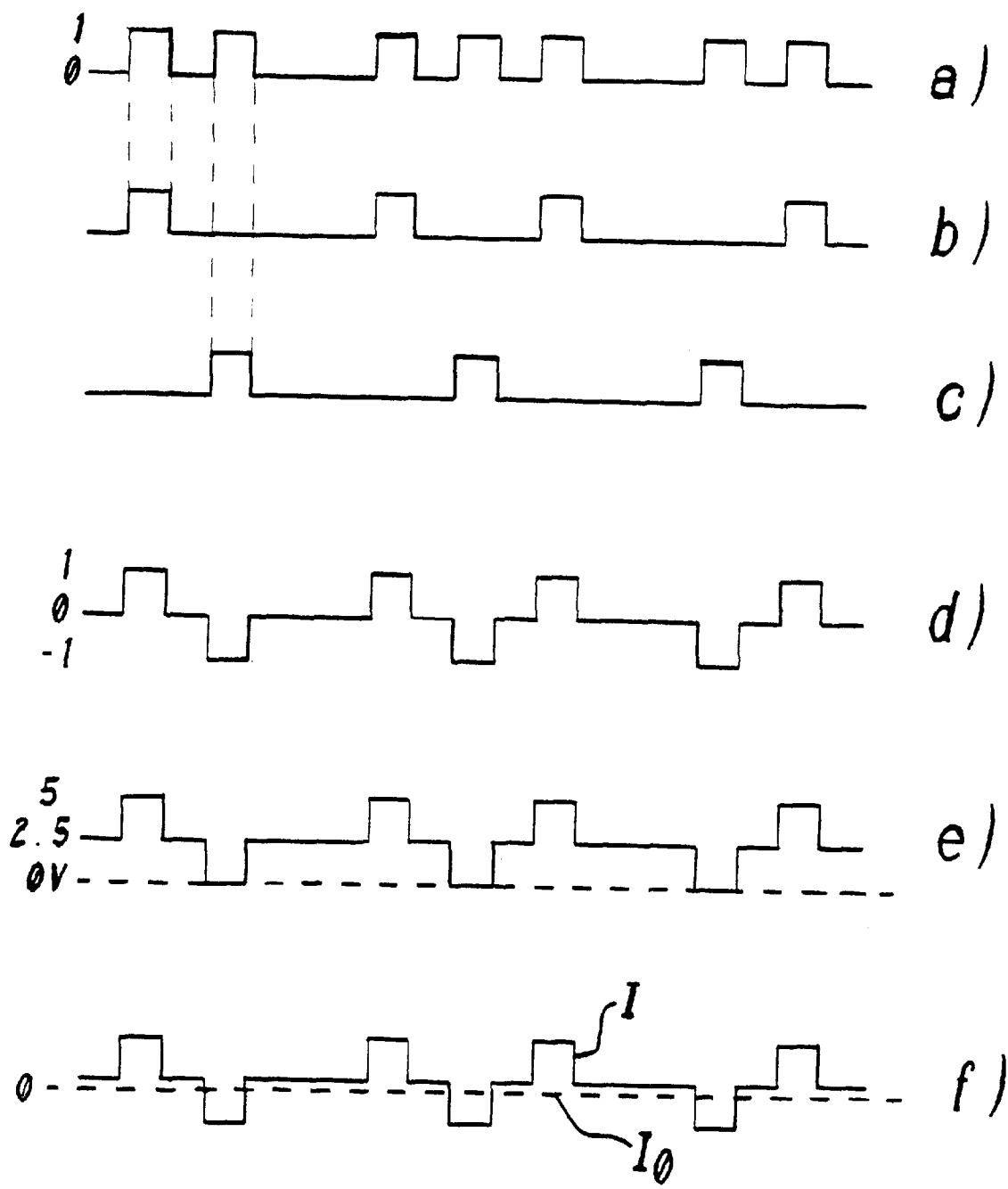
FIG. 2 is a timing diagram showing a) through f) pulse trains that occur in data transmission with the apparatus according to FIG. 1.

In order now according to the invention to be able to transmit the exemplary data train of FIG. 2a) with a negligibly small direct current component via the current interface 16, the binary signal train of FIG. 2a) is split into two partial trains shown in FIGS. 2b) and 2c). One partial train contains every other 1 signal, and the other partial train contains the remaining 1 signals, or in other words the ones in between. This splitting up of the signal train is done, in the circuit of FIG. 1, in a trigger unit 23, which may also be part of the afore-mentioned microprocessor. The trigger unit 23 has two outputs, at each of which one of the two partial trains from FIG. 2, b) and c) appears and is sent onward to one of the switches SW1 and SW2 for triggering. If a 1 value appears in the partial train at the upper output, then the switch SW1 is closed. If a 1 value appears in the partial train at the lower output, then the switch SW2 is closed. Conversely, if a 0 value appears, then both switches remain open.

As a result of the alternating closure of the switches SW1 and SW2 upon successive 1 values, the aforementioned shift in potential occurs at the node point K1, and the result is a voltage course as shown in the timing graph e) of FIG. 2. In accordance with this voltage course, the current I in the current interface 16 or through the resistor R4 fluctuates about the resting current $I_0$, as shown on line f) of FIG. 2.

At the node points K2 and K3 at the series resistor R4, these current changes are converted into corresponding changes in the voltage drop.

The positive changes are detected by the first comparator CO1, and the negative changes are detected by the second comparator CO2. At the outputs of the comparators CO1 and CO2, the partial signal trains b) and c) of FIG. 2 are then available again; in the following decoder or decoding unit 21, they are reassembled into the original data signal a) and sent on to the evaluation unit.

The invention is preferably employed in arrangements for controlling an occupant protection system, since for this safety-critical application, reserve energy stores must be furnished for proper operation of the arrangement even after its disconnection from the on-board electrical system. In particular, the current interface of the invention is useful in data transmission between a remote collision sensor and a centrally disposed evaluation unit, but also between such an evaluation unit and a remote firing station, which is disposed in or at the occupant protection means and to which the evaluation unit sends an encoded command for firing the occupant protection means and causes the imposition of energy on the firing element of the passenger protection device.

I claim:

1. A method of transmitting digital data from a measurement station of a motor vehicle occupant protection system to an air bag control unit, which comprises:

supplying a measurement station with a direct signal from a direct current or direct voltage source of an air bag control unit;

varying the direct signal with the measurement station in accordance with data to be transmitted;

transmitting data and thereby varying a current such that the variations cancel one another out on average over time; and detecting and evaluating the variations in the direct signal as current changes in the air bag control unit.

2. The method according to claim 1, wherein a series resistor is connected at the air bag control unit in at least one supply line connected to the measurement station, and the method further comprises measuring a voltage drop at the series resistor for ascertaining the transmitted data.

3. The method according to claim 1, wherein the transmitting step comprises:

transmitting the digital data in a train of binary characters;

transmitting a logic zero by leaving the direct signal unvaried;

transmitting a logic one by selectively increasing and decreasing the direct signal by a predetermined amount, and thereby increasing the direct signal if the direct signal had been decreased to transmit a preceding logic one; and decreasing the direct signal if the direct signal had been increased to transmit the preceding logic one.

4. The method according to claim 3, which comprises providing an energy store in the measurement station, and charging the energy store to increase the current and discharging the energy store to reduce the current.

5. The method according to claim 4, wherein the energy store is a capacitor.

6. The method according to claim 4, which comprises providing two switches connected to the energy store and controlling charging and discharging of the energy store with the two switches, and thereby triggering the switches in alternation upon successive logic one values of the data train.

7. An apparatus for transmitting digital data in a motor vehicle, comprising:

an air bag control unit and a measurement station connected to said air bag control unit;

a direct current or direct voltage source in said air bag control unit for supplying said measurement station with a direct signal;

a first device in said measurement station for varying the direct signal in accordance with data to be transmitted to said air bag control unit, said first device include an energy store to be charged in controlled fashion to increase the current and to be discharged in controlled fashion to decrease the current; and a second device in said air bag control unit for detecting and evaluating changes in the direct signal in the form of current changes.

8. The apparatus according to claim 7, wherein said energy store is a capacitor.

9. The apparatus according to claim 8, wherein said measurement station receives a supply voltage, said capacitor is connected in said measurement station such that, in an absence of data transmission, said capacitor is charged to an intermediate voltage between 0 V and the supply voltage, said first device includes a first switch and a second switch connected such that an actuation of said first switch causes said capacitor to increase the direct signal and an actuation of said second switch causes the capacitor to decrease the direct signal.

10. The apparatus according to claim 9, wherein said measurement station includes a voltage regulator for deriving the supply voltage from the direct signal and a voltage divider subjected to the supply voltage, said voltage divider having a first resistor and a second resistor connected to one another at a node point acting as a center tap, said capacitor being connected between an input of said voltage regulator and said center tap of said voltage divider, said first switch being connected in parallel with said first resistor and said second switch being connected in parallel with said second resistor.

11. The apparatus according to claim 9, wherein said first device includes a trigger unit for triggering said first and second switches in accordance with the data train to be transmitted.

12. The apparatus according to claim 10, which further comprises a common resistor commonly connecting said first and second switches to said center tap.

13. The apparatus according to claim 11, wherein said measurement station includes a sensor and a monitoring unit connected to said sensor, said monitoring unit generating the data trains to be transmitted in accordance with signals received from said sensor and forwarding the data trains on to said trigger unit for transmission.

* * * * *